Dec. 14, 1965     L. K. KEEN     3,223,763
METHOD OF MAKING A METAL REINFORCED PLASTIC ARTICLE
Filed Aug. 22, 1962
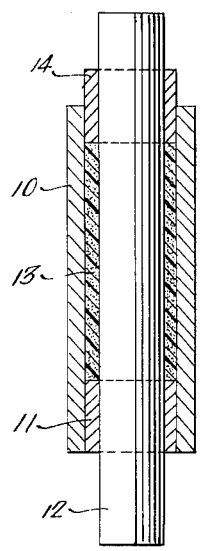
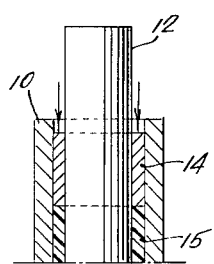
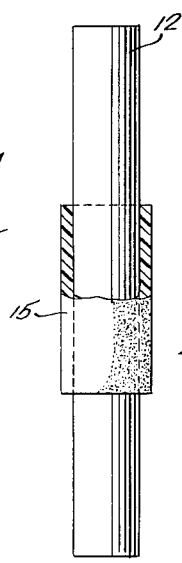
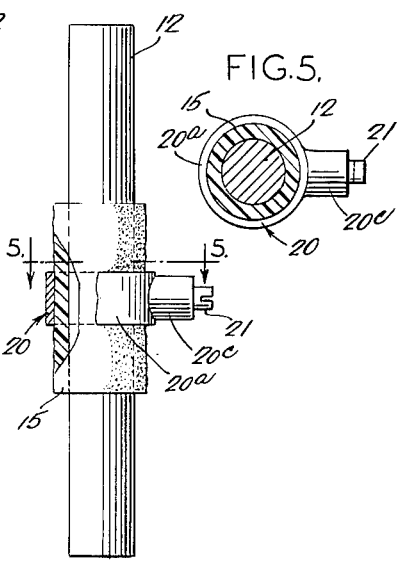
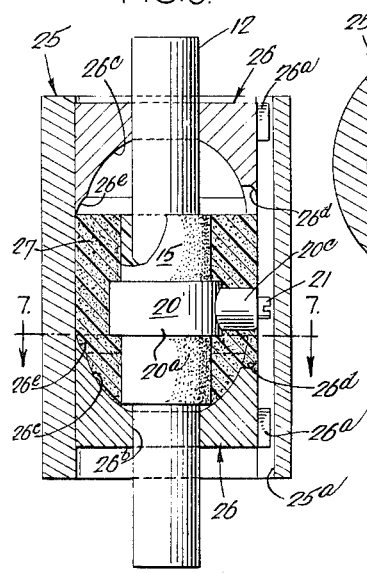
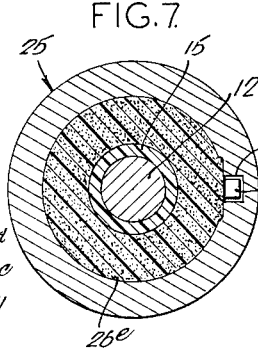
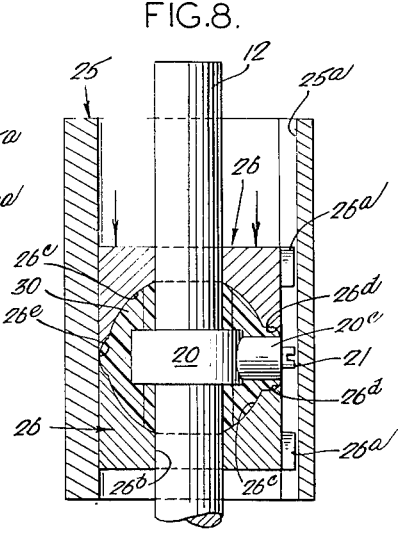
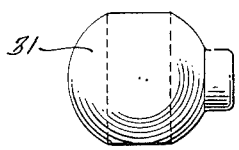
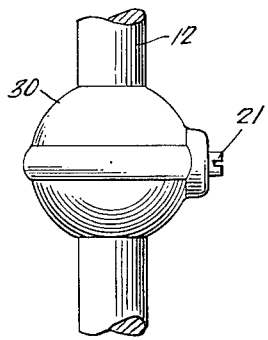
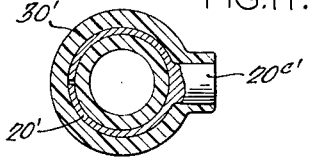
INVENTOR:
LESTER K. KEEN
BY Howson & Howson
ATTYS.

United States Patent Office 3,223,763
Patented Dec. 14, 1965

3,223,763
METHOD OF MAKING A METAL REINFORCED PLASTIC ARTICLE
Lester K. Keen, Lancaster, Pa., assignor to Raybestos-Manhattan, Inc., Manheim, Pa., a corporation of New Jersey
Filed Aug. 22, 1962, Ser. No. 218,726
5 Claims. (Cl. 264—112)

This invention relates to a method of making a metal reinforced plastic article. The article has a reinforcing metal insert and a body of plastic completely covering the insert on all sides and having a bore therethrough, such for example, as a metal reinforced polytetrafluoroethylene (PTFE) coated ball of a ball valve. The invention has for a general object the provision of improvements in this art.

It is becoming a common practice in handling corrosive fluids to use pipes lined with a plastic which is resistant or inert to corrosion. The valves for such pipes also need to be lined with plastic on all surfaces which are exposed to the corrosive fluid. It is very difficult to provide a satisfactory plastic surfaced valve plug or ball. If the body is made entirely of plastic it is not very difficult to form it; but plastic alone is not sufficiently rigid, strong or stage in shape to serve the purpose and requires reinforcement, as by a metal insert. Here again there is difficulty because cracks and flaws usually develop, especially due to different expansion ratios, to leave the metal exposed in places and the valve is uselesss if it does not remain fully covered with plastic.

Moreover, the plastic should be non-porous and of uniform density and texture throughout the body or faulty operation will be experienced.

According to the present invention the investment of the insert is conducted in successive stages of procedure which assure sound coverage of the reinforcing insert, both inside the bore and on the outer surfaces of the valve body.

For a better understanding of the invention certain specific embodiments will be described, reference being made to the accompanying drawings, wherein:

FIG. 1 is a section through a preform mold showing particulate plastic material therein ready to be compressed;

FIG. 2 is a partial view like FIG. 1 showing the material after compression;

FIG. 3 is an elevation, partly in section, showing the preform removed from the mold;

FIG. 4 shows the metal insert positioned on the preform;

FIG. 5 is a transverse section taken on the line 5—5 of FIG. 4;

FIG. 6 shows the preform and metal insert positioned in a final mold and the mold filled with plastic material;

FIG. 7 is a transverse section taken on the line 7—7 of FIG. 6;

FIG. 8 shows the parts of FIG. 6 in final position;

FIG. 9 shows the final molded part after removal from the mold;

FIG. 10 shows the final article after being finished to final shape; and

FIG. 11 is a transverse section of a final article with a modified form of reinforcement.

As shown in FIG. 1, a preform mold tube 10 of desired size and length is provided, a bottom closure ring 11 placed inside, and a bore-forming core pin 12 inserted in the ring. Then the annular space is filled with plastic material 13 in powder form to the desired depth. After filling, an annular top pusher ring 14 is inserted and pushed down, as by an annular plunger in a press, until the preform has the desired length and density. The completed preform 15 is shown in FIG. 2.

The preform 15 is removed from the mold tube 10 and the annular rings 11 and 14 removed from the core pin but the core pin 12 is kept in the preform, as shown in FIG. 3.

A metal insert 20 with an annular band portion is placed on the preform, the annular part or band 20a of the insert having a sufficiently tight fit to remain medially of the preform where it is placed. A projection 20c will form the operative stem of the valve plug. A guide plug 21 is screwed into a threaded opening in the projection 20c.

After the insert 20 has been placed on the preform the outer exposed surfaces of the preform are roughened, as indicated in FIG. 4, so as to knit with additional plastic material in a subsequent molding operation.

The preform 15, with the core pin 12 and metal insert 20, is placed in a final mold tube 25 having an interior groove 25a into which the guide plug 21 fits for sliding movement.

A bottom mold part 26 is placed in the mold tube 25 with a lateral projection 26a thereof fitting in the axial groove 25a of the tube and with the core pin 12 passing slidably through an opening 26b therein. The mold part has a hemispherical mold cavity 26c and a side groove or recess 26d around the stem projection 20c. The hemispherical cavity is flared at the large end, as at 26e, to minimize the formation of extremely high pressure or shear areas during the pressing step. As shown in FIG. 6, the lower end of the preform 15 rests on the bottom of the inside surface of the mold part around the core pin 12.

Powdered plastic material 27 is placed in the mold cavity and tamped down below the metal insert until the bottom mold part is filled. Then additional material is put in and tamped down until the added material is as high as the upper end of the preform 15.

After filling, another mold part 26 which is like the one first described is placed in inverted position in the mold tube 25, the core pin 12 being passed through the opening 26b therein, and the mold parts pressed together, as shown in FIG. 8. The final molded body 30, as shown in FIGS. 8 and 9, is produced.

The final molding pressure may be about 4000 p.s.i.

The molded article with the core pin still in position but with all other mold parts removed is heated to fuse the plastic material. In the case of polytetrafluoroethylene, the molded article may be placed in a sintering oven and heated for about two hours with the final temperature reaching about 710° F. and held at this temperature for about 6 hours. The temperature may then be lowered at about the rate of 50° F. per hour until room temperature is reached.

The plug 21 and core pin 12 are removed and then machines to produce the finished form or ball 31 shown in FIG. 10.

As stated, a fluorocarbon such as polytetrafluoroethylene is one class of material which is highly inert to most corrosive fluids and has good molding and machining characteristics.

In the example given above a relatively low density preform is used. It could be made at low pressures of from a very low pressure of about 5 p.s.i. up to 300 p.s.i. It is also possible to use a shorter pre-sintered plastic core tube which has been machined to fit the metal core pin and the interior of the metal insert. In this case in the final mold a body of plastic powder would first be put into the hemispherical mold, then the machined plastic core tube with the insert thereon pushed down on the core pin into the body of plastic powder, then the mold tube filled with plastic powder for a distance above the plastic core tube and then the uppper hemispherical mold part put on and pushed down. In this case the sintered core tube, though shorter and denser than the molded core tube preform, may still be characterized as a preform. Reprocessed PTFE can be used with the sintered preform.

Various types of PTFE may be used. Du Pont catalogs and instruction books may be referred to for information as to which are suitable and how best to use them. The molded article may be free-sintered or sintered under pressure in a mold. Sintering temperatures may range from 630° F. to 750° F. Temperature reduction for cooling may range from 1° F. per hour to 100° F. per hour. Final molding pressures may range from 1000 p.s.i. to 5000 p.s.i. Reference to plastic in powder form includes granular and small particle forms.

The plastic material is substantially uniform in density, because the ring is very thin radially relative to the thickness of plastic except that the plastic covering inside the ring is relatively thin and here the use of a preform assures full coverage without cracks, and because the compression is axial instead of normal to the relatively wide axially aligned surface of the reinforcement.

In FIG. 11 there is shown a finished body or plug 30' with a solid metal reinforcing ring 20' having a transverse slit on one side, the side opposite the projection 20c'.

As a specific example, the initial fill depth of the preform may be 10½"; the low density preform may have a length of 5" to 5¼" and a density of 0.038 lb./cu. in. specific gravity of 1.055 and a weight of 6½ ounces; the total weight of PTFE in the final ball may be 29¼ ounces and have a compressed density of 0.072 to 0.086 lb./cu. in.

The invention provides an improved method of encapsulating a reinforcing insert in a plastic body, especially for forming a valve ball of a moldable fluorocarbon, and also provides an improved and more reliable product.

While one embodiment and a modification of the invention has been described for purposes of illustration, it is to be understood that there may be various embodiments and modifications within the scope of the invention.

I claim:
1. The method of making a valve plug comprising a body of compressed and sintered fluorocarbon polymer having a bore therethrough and reinforced by a metal insert having an annular band portion which is completely covered with fluorocarbon polymer which comprises: forming a tubular core preform by introducing powdered fluorocarbon polymer into the annular space between a core pin and a tubular mold and compacting said polymer particles by applying pressure axially of said mold, the outer diameter of said core preform being such as to tightly engage the inner annular band portion of said reinforcing metal insert, positioning the annular band portion of said insert on the tubular preform intermediate the ends of said preform, placing the preform, core pin and insert as a core unit in a plug-forming mold with the preform and reinforcing insert located at an intermediate position axially in said mold, filling the plug-forming mold with powdered fluorocarbon polymer so as to surround said preform and insert, applying pressure axially of said mold to form a coherent valve plug body in which said polymer forming said core preform is united with said polymer forming the body of said valve plug, and sintering said body of polymer to form a homogeneous body of sintered polymer completely surrounding said reinforcing insert.

2. The method of making a valve plug as set forth in claim 1, characterized in that the coherent molded valve plug body is sintered in the absence of pressure.

3. The method of making a valve plug as set forth in claim 1, further characterized in that the core preform is further compressed axially and sintered prior to application of the reinforcing insert thereto.

4. The method of making a valve plug as set forth in claim 1, characterized in that said fluorocarbon polymer comprises polytetrafluoroethylene.

5. The method of making a valve plug as set forth in claim 1, further characterized in that said polymer forming said core preform is compacted under a pressure of from about 5 to about 300 p.s.i., and said valve plug body is formed under a pressure on the order of 4000 p.s.i.

References Cited by the Examiner

UNITED STATES PATENTS

| | | | |
|---|---|---|---|
| Re. 15,653 | 7/1923 | Allcutt | 264—250 XR |
| 807,437 | 12/1905 | Burt | 264—112 |
| 1,919,816 | 7/1933 | Wiegard | 264—254 XR |
| 2,832,563 | 4/1958 | Walsh | 251—309 |
| 2,864,579 | 12/1958 | Stoltenberg | 251—309 |
| 2,953,841 | 9/1960 | Bullock | 29—157.1 |
| 2,972,784 | 2/1961 | Shonka et al. | 264—112 |
| 3,011,219 | 12/1961 | Williams | 264—127 XR |
| 3,052,445 | 9/1962 | Kessler | 251—309 |
| 3,073,336 | 1/1963 | Johnson | 251—217 XR |
| 3,077,029 | 2/1963 | Kaye | 29—157.1 |

FOREIGN PATENTS

| | | |
|---|---|---|
| 576,138 | 5/1959 | Canada. |
| 647,005 | 8/1962 | Canada. |
| 1,012,501 | 7/1957 | Germany. |
| 822,744 | 10/1959 | Great Britain. |

ALEXANDER H. BRODMERKEL, *Primary Examiner.*
ISADOR WEIL, *Examiner.*